(12) United States Patent
Hedrington

(10) Patent No.: US 7,523,697 B2
(45) Date of Patent: Apr. 28, 2009

(54) TILTABLE COOKING APPLIANCE

(75) Inventor: James A. Hedrington, Chippewa Falls, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 958 days.

(21) Appl. No.: 11/084,059

(22) Filed: Mar. 18, 2005

(65) Prior Publication Data

US 2005/0229792 A1  Oct. 20, 2005

Related U.S. Application Data

(60) Provisional application No. 60/554,937, filed on Mar. 18, 2004.

(51) Int. Cl.
*A21B 7/00* (2006.01)
(52) U.S. Cl. .................. 99/348; 99/422; 219/452.11
(58) Field of Classification Search .............. 99/422, 99/348
See application file for complete search history.

(56) References Cited

U.S. PATENT DOCUMENTS

| | | | | |
|---|---|---|---|---|
| 1,334,908 A | * | 3/1920 | Kinzel | .......................... 220/832 |
| 1,505,681 A | * | 8/1924 | Warner | .................... 219/450.1 |
| 2,009,791 A | | 7/1935 | Shroyer | |
| 2,175,500 A | * | 10/1939 | Bemis | ......................... 99/340 |
| 2,574,411 A | * | 11/1951 | Pashby | ....................... 220/759 |
| 3,086,448 A | * | 4/1963 | Forman | ....................... 99/425 |
| 3,215,063 A | * | 11/1965 | Olson et al. | .................... 99/425 |
| 3,635,371 A | * | 1/1972 | Oxel | ........................ 220/605 |
| 3,744,475 A | | 7/1973 | Myler et al. | |
| 3,927,610 A | | 12/1975 | Minsky et al. | |
| 3,964,378 A | | 6/1976 | Dunkelman | |
| D265,538 S | * | 7/1982 | Nauheimer et al. | .......... D7/360 |
| 5,553,531 A | | 9/1996 | Brown | |
| 6,064,042 A | * | 5/2000 | Glucksman et al. | .... 219/452.13 |
| D457,393 S | * | 5/2002 | Lewis | .......................... D7/402 |
| 6,844,529 B2 | * | 1/2005 | Grohs | ..................... 219/450.1 |
| 2006/0163242 A1 | * | 7/2006 | Ciancimino et al. | ....... 219/450.1 |

* cited by examiner

*Primary Examiner*—Thor S Campbell
(74) *Attorney, Agent, or Firm*—Patterson, Thuente, Skaar & Christensen, P.A.

(57) ABSTRACT

The invention includes a cooking apparatus comprising a cooking plate and a handle assembly. The cooking plate has a cooking surface and an opposed lower surface. A handle assembly is operably coupled to the cooking plate and shiftable between a first handle position and a second handle position relative to the cooking plate, the handle assembly includes an interface structure having a first depth and a second depth. The first depth engages the lower surface when the handle assembly is in the first handle position and the second depth engages the lower surface when the handle assembly is in the second handle position.

21 Claims, 12 Drawing Sheets

US 7,523,697 B2

TILTABLE COOKING APPLIANCE

RELATED APPLICATION

This application claims priority to U.S. Provisional Patent Application No. 60/554,937 filed Mar. 18, 2004 entitled "Tiltable Cooking Appliance" which is incorporated herein by reference.

FIELD OF THE INVENTION

The present invention relates to cooking appliances, particularly cooking appliances adapted to drain fats and oils away from food being cooked on or in the cooking appliance.

BACKGROUND OF THE INVENTION

Cooking appliances, particularly cooking appliances adapted to drain fats and oils away from food being cooked in the cooking appliance are known. The cooking appliances typically have four legs for supporting a heating plate above a supporting surface or counter. The heating plate is typically positionable between a generally horizontal cooking position and a tilted draining position, such as depicted in U.S. Pat. No. 3,635,371 to Oxel and U.S. Pat. No. 3,927,610 to Minsky et al.

Such cooking appliances usually include an additional leg that is pivotally coupled to the cooking appliance to drain the fats and oils away from the food. The additional leg typically has a length greater than the rest of the legs supporting the heating plate. When the additional leg is used, a portion of the heating plate is elevated such that a pair of the legs supporting the heating plate no longer make contact with the supporting surface. As a result, there are only three legs supporting the heating plate in the draining position causing a potential hazardous situation if the cooking appliance tips over.

In order to minimize the potential for injury to a user, it is desirable that all of the legs supporting the heating plate remain on the supporting surface.

SUMMARY OF THE INVENTION

The present invention provides a heating plate or griddle that is tiltable for supporting and cooking food. The present invention also includes at least a pair of handles for supporting and for facilitating tilting of the heating plate above a horizontal support surface. The heating plate is preferably electric having a heating element coupled to a lower surface of the heating plate. The handles are preferably disposed to respective opposed ends of the heating plate. Each of the handles may have a pair of spaced legs with each of the spaced legs having a downward extending foot portion. Outward lateral movement of each of the handles with respect to the heating plate tilts the heating plate between a generally horizontal cooking position and a draining cooking position. When the heating plate is in the draining cooking position, fats and oils accumulating on the heating plate during cooking drain away from the food.

In one embodiment, the invention includes a cooking apparatus supportable on a generally horizontal support surface. The cooking apparatus comprises a cooking plate having a cooking surface and an opposed lower surface. A handle assembly is operably coupled to the cooking plate and is shiftable between a first handle position and a second handle position relative to the cooking plate. The handle assembly includes a downwardly extending leg element adapted for orienting the cooking surface in spaced apart relationship with the generally horizontal support surface. The invention also includes an interface structure oriented between the handle assembly and the cooking plate lower surface. The interface structure includes a first portion having a first depth and a second portion having a second depth. The interface structure first portion operably engages the cooking plate lower surface when the handle assembly is in the first position and the interface second portion operably engages the cooking plate lower surface when the handle assembly is in the second position, such that the cooking plate is shiftable between a first position generally parallel to the support surface when the handle assembly is in the first position, and a second position generally transverse to the support surface when the handle assembly is in the second position.

In another embodiment, the invention includes a cooking apparatus comprising a cooking plate and a handle assembly. The cooking plate has a cooking surface and an opposed lower surface. A handle assembly is operably coupled to the cooking plate and shiftable between a first handle position and a second handle position relative to the cooking plate, the handle assembly includes an interface structure having a first depth and a second depth. The first depth engages the lower surface when the handle assembly is in the first handle position and the second depth engages the lower surface when the handle assembly is in the second handle position.

In yet another embodiment, the invention includes a cooking apparatus supportable on a generally horizontal support surface. The cooking apparatus includes a cooking plate and a plurality of handles. The cooking plate includes a cooking surface and an opposed lower surface. The plurality of handles are rotatably coupled to the cooking plate and shiftable between a first handle position and a second handle position relative to the cooking plate. The plurality of handles includes a leg element adapted to orient the cooking plate in spaced apart relationship with the generally horizontal support surface. The cooking apparatus also includes and interface structure integral with the plurality of handles and operably engaging the lower surface of the cooking plate. The interface structure includes a first portion having a first depth and a second portion having a second depth distinct from the first depth, such that the cooking plate is shiftable between a first position generally parallel to the support surface when the handle assembly is in the first position, and a second position generally transverse to the support surface when the handle assembly is in the second position.

BRIEF DESCRIPTION OF THE DRAWINGS

The invention may be more completely understood in consideration of the following detailed description of various embodiments of the invention in connection with the accompanying drawing, in which.

Figure 1:
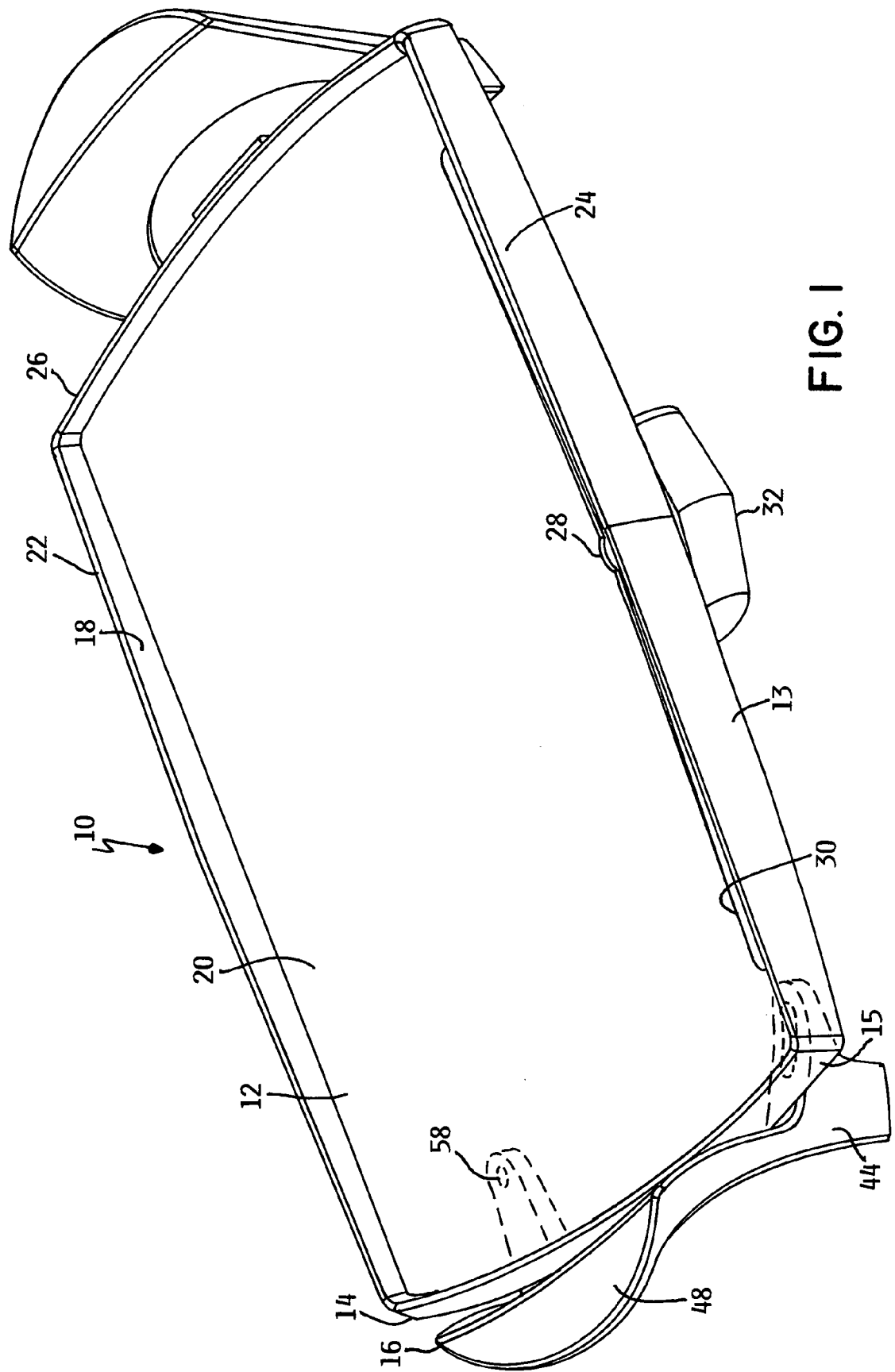
FIG. 1 is a perspective view of the cooking appliance in the horizontal cooking position.

While the invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims.

DETAILED DESCRIPTION OF THE DRAWINGS

The present invention is generally directed to a method and apparatus for tilting a heating plate or griddle between a generally horizontal cooking position and a tilted, draining cooking position. While the present invention is not necessarily limited to such an application, the invention will be better appreciated using a discussion of example embodiments in such a specific context.

A cooking appliance is shown generally at 10 in FIG. 1. Cooking appliance 10 generally includes a tiltable heating plate 12 for cooking food. Cooking appliance 10 also preferably includes at least a pair of handles 16 rotatably disposed to the heating plate 12 for supporting and facilitating the tilting of heating plate 12 from a generally horizontal cooking position toward a generally tilted draining cooking position.

Figure 2:
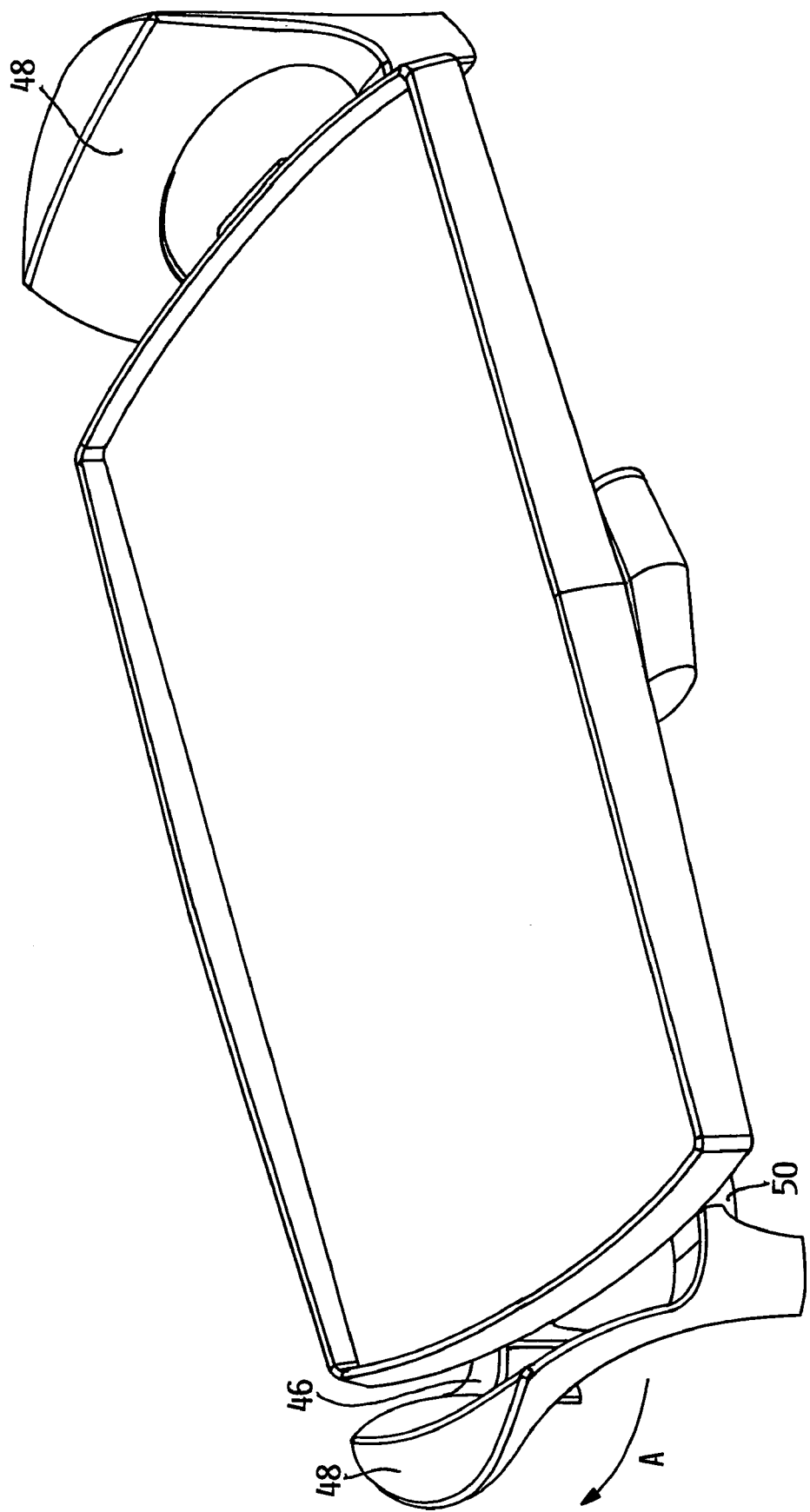
FIG. 2 is a perspective view of the cooking appliance in the draining cooking position.
Figure 3:
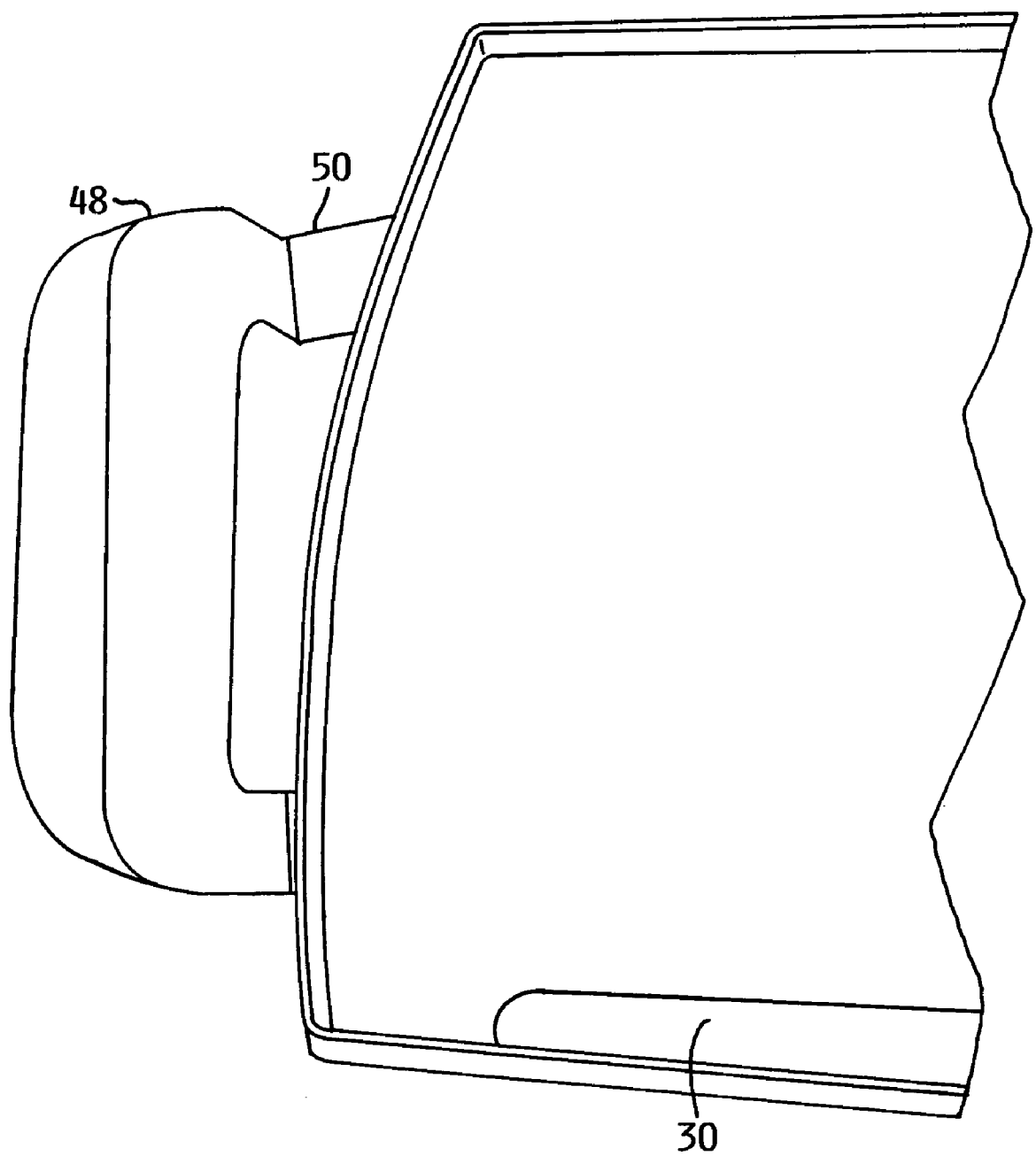
FIG. 3 a partial top plan view of the cooking appliance in the horizontal cooking position.

As illustrated in FIGS. 1 and 2, heating plate 12 may include a front edge 13, rear edge 14 and a pair of side edges 15. In one embodiment of the present invention, rear edge 14 of heating plate 12 remains a static distance from the generally horizontal supporting surface regardless of the position of handles 16. Front edge 13 of heating plate 12, on the other hand, may be positioned generally nearer the horizontal supporting surface when in its tilted/draining cooking position. In a related embodiment, heating plate 12 may be configured to tilt any one of its edges 13-14 depending upon how heating plate 12 is configured to tilt. In another embodiment, side edges 15 may be configured to tilt.

In one embodiment of the present invention, heating plate 12 includes a peripheral wall 18 that is integral to and extends generally up from an upper surface 20 of heating plate 12 for containing the food and fats and oils. Peripheral wall 18 includes a rear wall portion 22, a front wall portion 24 and a pair of lateral side wall portions 26 integral to and connecting the front 24 and rear 22 wall portions.

In this embodiment of the present invention, each of the peripheral wall portions 22, 24, and 26 has a generally sloping inner surface. Additionally, rear 22 and side wall 26 portions of peripheral wall 18 have a generally uniform height. Front wall portion 24 has a height generally greater than rear 22 and side wall portions 26 for containing a flow of fats and oils when heating plate 12 is in its draining cooking position.

Figure 11:
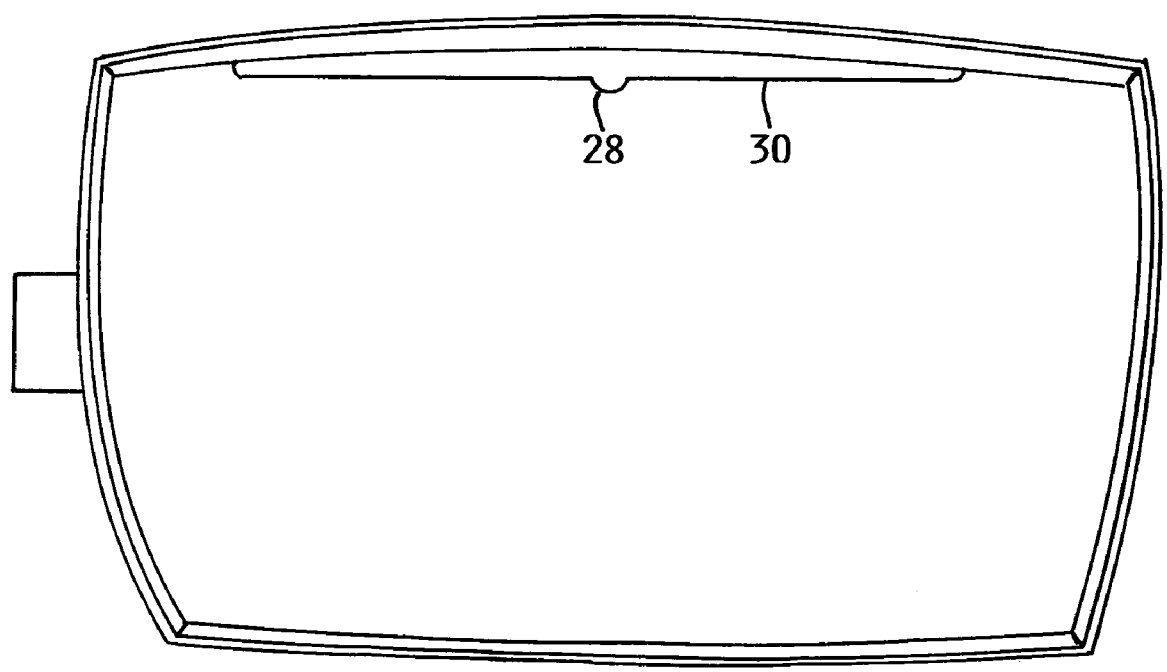
FIG. 11 is a top plan view of the cooking appliance.
Figure 12:
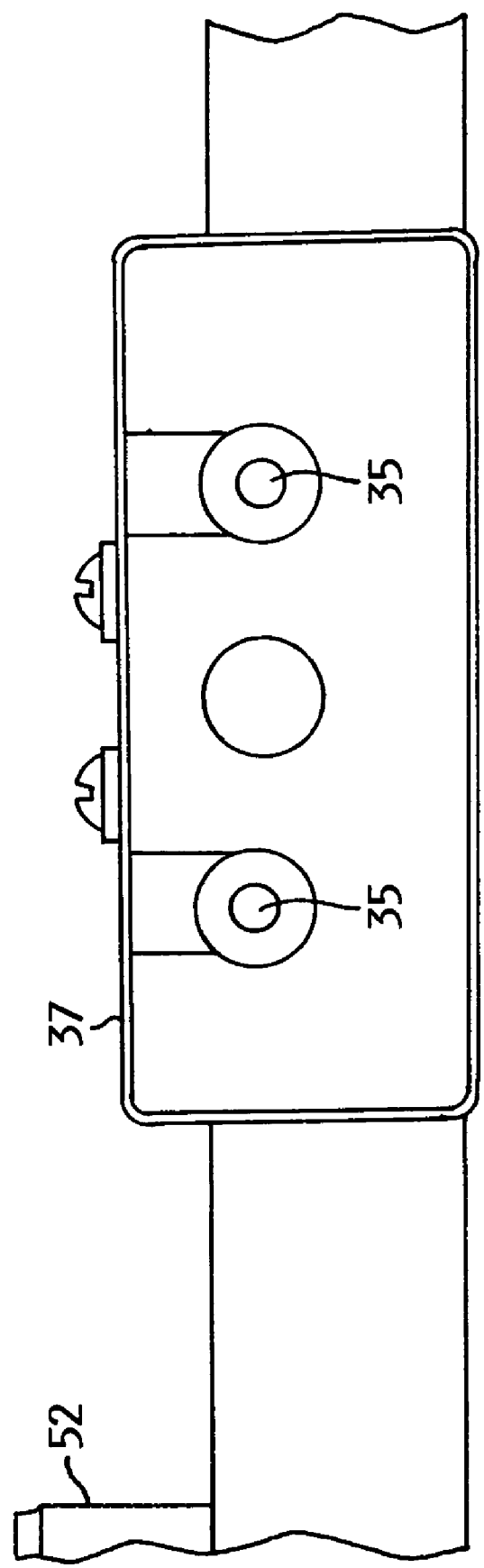
FIG. 12 is a partial side view of the cooking appliance showing a socket.

As illustrated in FIGS. 1 and 11, upper surface 20 of heating plate 12 may include a drain aperture 28 for receiving fats and oils when heating plate 12 is tilted in its draining cooking position. Drain aperture 28 is positioned generally adjacent to front edge 13 of heating plate 12. Drain aperture 28 may also be positioned generally an equidistance from the pair of side edges 26 of heating plate 12 or positioned generally adjacent to any of the edges 22, 24, or 26 of heating plate 12 depending upon the tilting configuration of heating plate 12.

As illustrated in FIGS. 1 and 11, heating plate 12 may also include at least one channel 30 for channeling a flow of fats and oils toward drain aperture 28. Channel 30 is preferably in fluid communication with drain aperture 28, such that fats and oils entering channel 30 flow toward and through drain aperture 28. In one embodiment of the present invention, channel 30 may extend laterally away from drain aperture 28 toward any one of the edges 22, 24 or 26 of heating plate 12. As particularly illustrated in FIG. 11, a pair of channels 30 may extend away from drain aperture 28 toward the pair of side edges 26 of heating plate 12.

Channel 30 may also have a depth that varies along its length. The depth may increase from a position generally nearer side edges 26 of heating plate 12 toward drain aperture 28. The difference in the depth of channel 30 permits an increased flow of fats and oils toward and into drain aperture 28.

As illustrated in FIG. 1, heating plate 12 may include a collection pan 32 for collecting and permitting easy disposal of the fats and oils flowing through drain aperture 28. Collection pan 32 may be slidably disposed in a pair of spaced rails 40 mounted to a lower surface 42 of heating plate 12. Collection pan 32 is positioned generally underneath drain aperture 28. Collection pan 32 is made of heat resistant plastic able to withstand the high temperatures of the fats and oils being collected. One skilled in the art would appreciate that collection pan 32 may be made from a variety of materials.

Heating plate 12 is manufactured from a generally rigid material such as, for example, steel or aluminum. However, as one skilled in the art can appreciate, other materials can also be used in the manufacture of heating plate 12. Heating plate 12 is also preferably made from a material capable of uniform heat transfer across its entire upper surface 20.

Upper surface 20 of heating plate 12 may also include a nonstick coating for preventing food from sticking to the upper surface 20 and for increasing the flow of fats and oils toward channel 30 and drain aperture 28. The nonstick coating may include any of a number of commercially available products that can be applied to upper surface 20 of heating plate 12. For instance, the nonstick coating may comprise polytetrafluoroethylene, however, other nonstick coatings may also be utilized.

Figure 10:
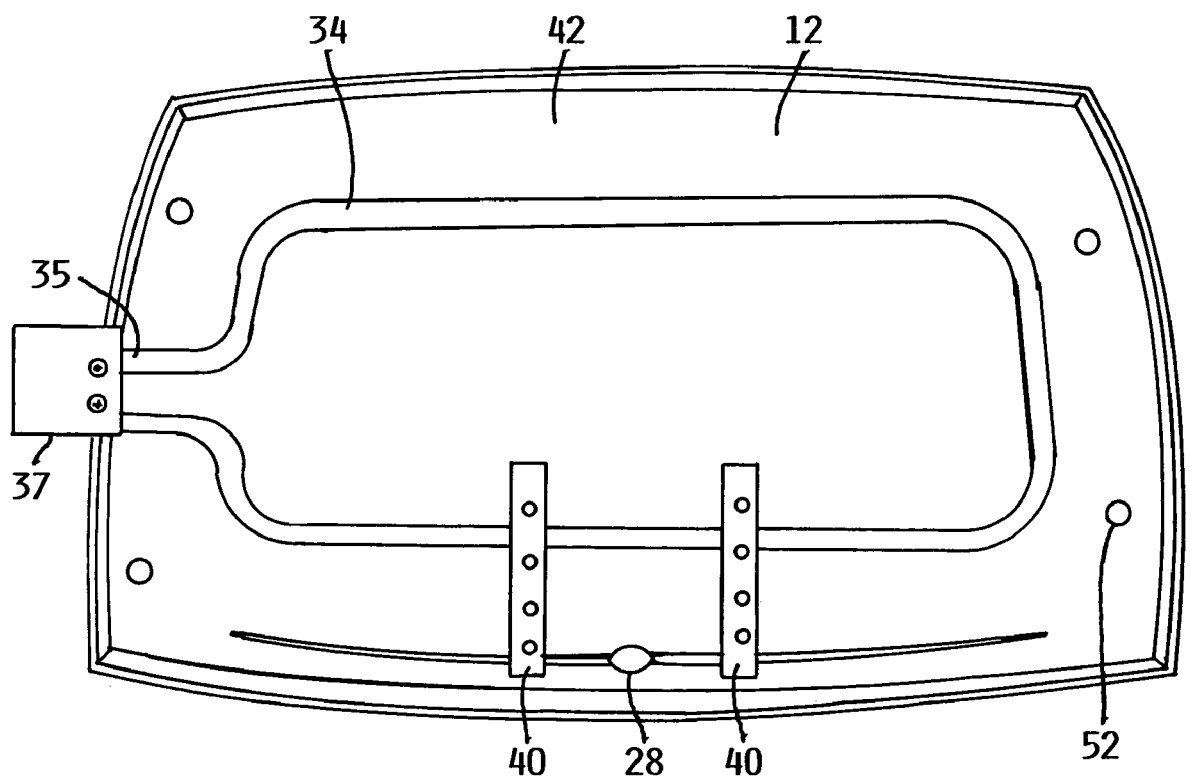
FIG. 10 is a bottom plan view of the cooking appliance.

In one embodiment of the present invention, heating plate 12 is heated via a temperature control unit, such as disclosed in U.S. Pat. No. 3,218,434, incorporated herein by reference. As illustrated in FIG. 10, a heating element 34 may be disposed to the lower surface 42 of heating plate 12. Heating element 34 preferably includes a pair of ends 35 positioned generally near each other such that heating element 34 forms generally a loop across the lower surface 42 of heating plate 12. Each of the ends 35 may be disposed in a socket 37 configured to mate with an electric plug or temperature control unit.

Figure 7:
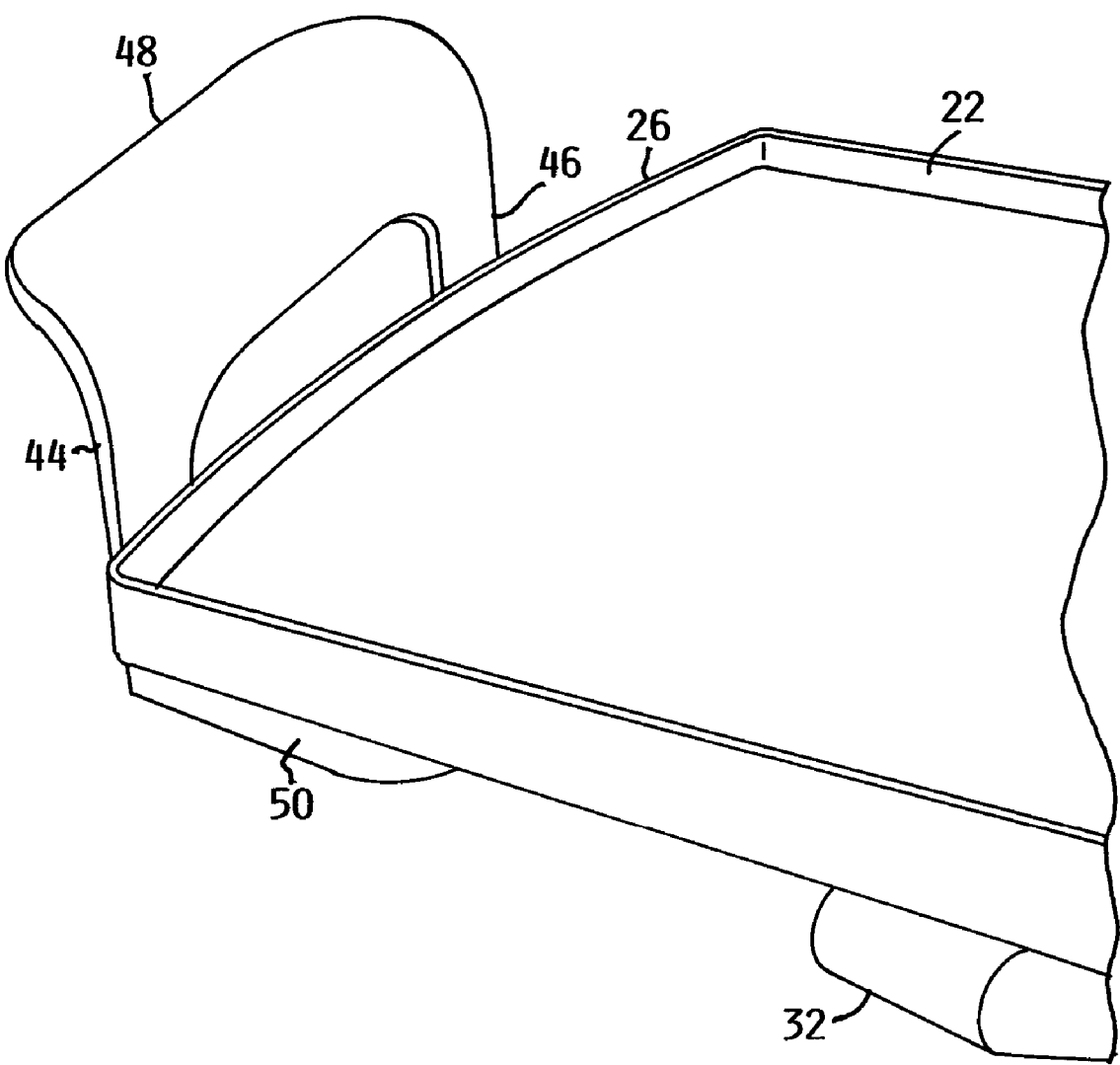
FIG. 7 is a partial perspective view of the cooking appliance in the horizontal cooking position.
Figure 8:
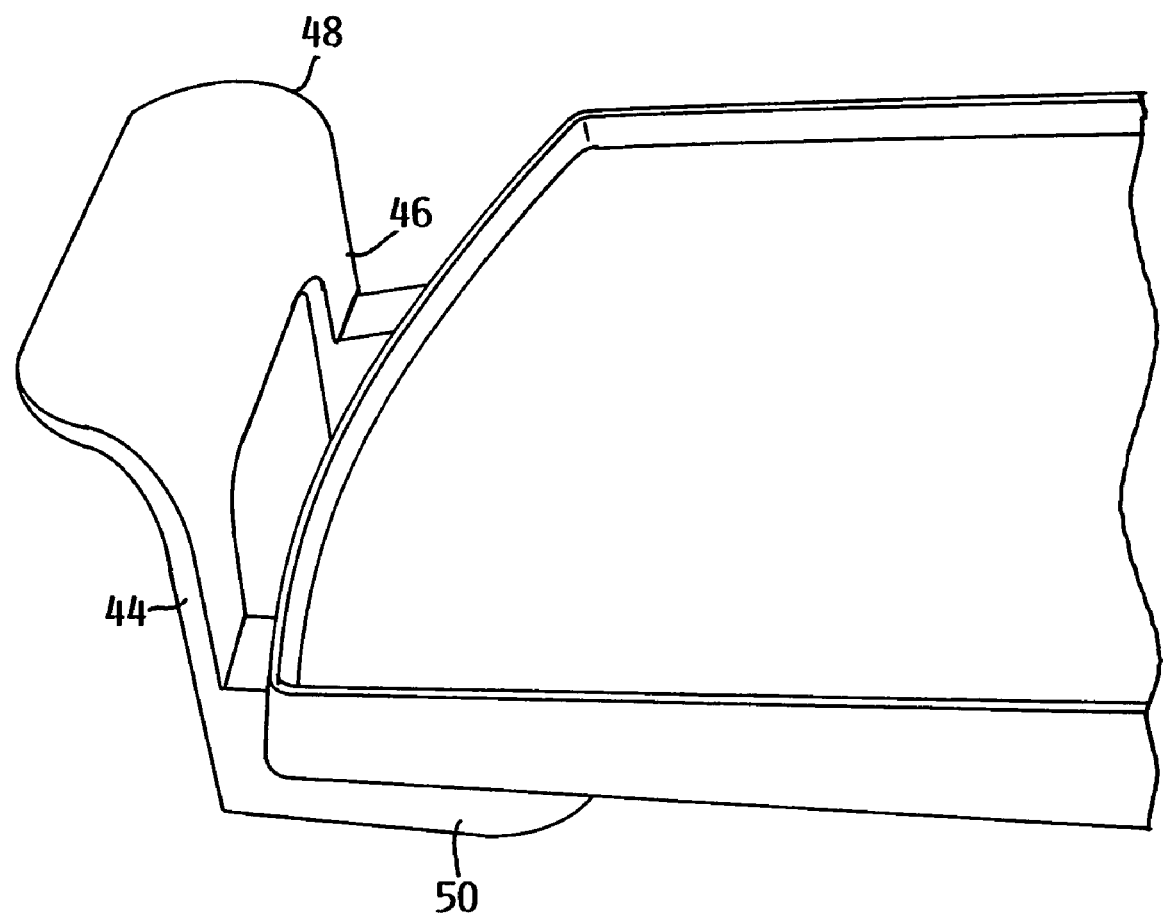
FIG. 8 is a partial perspective view of the cooking appliance in the horizontal cooking position.
Figure 9:
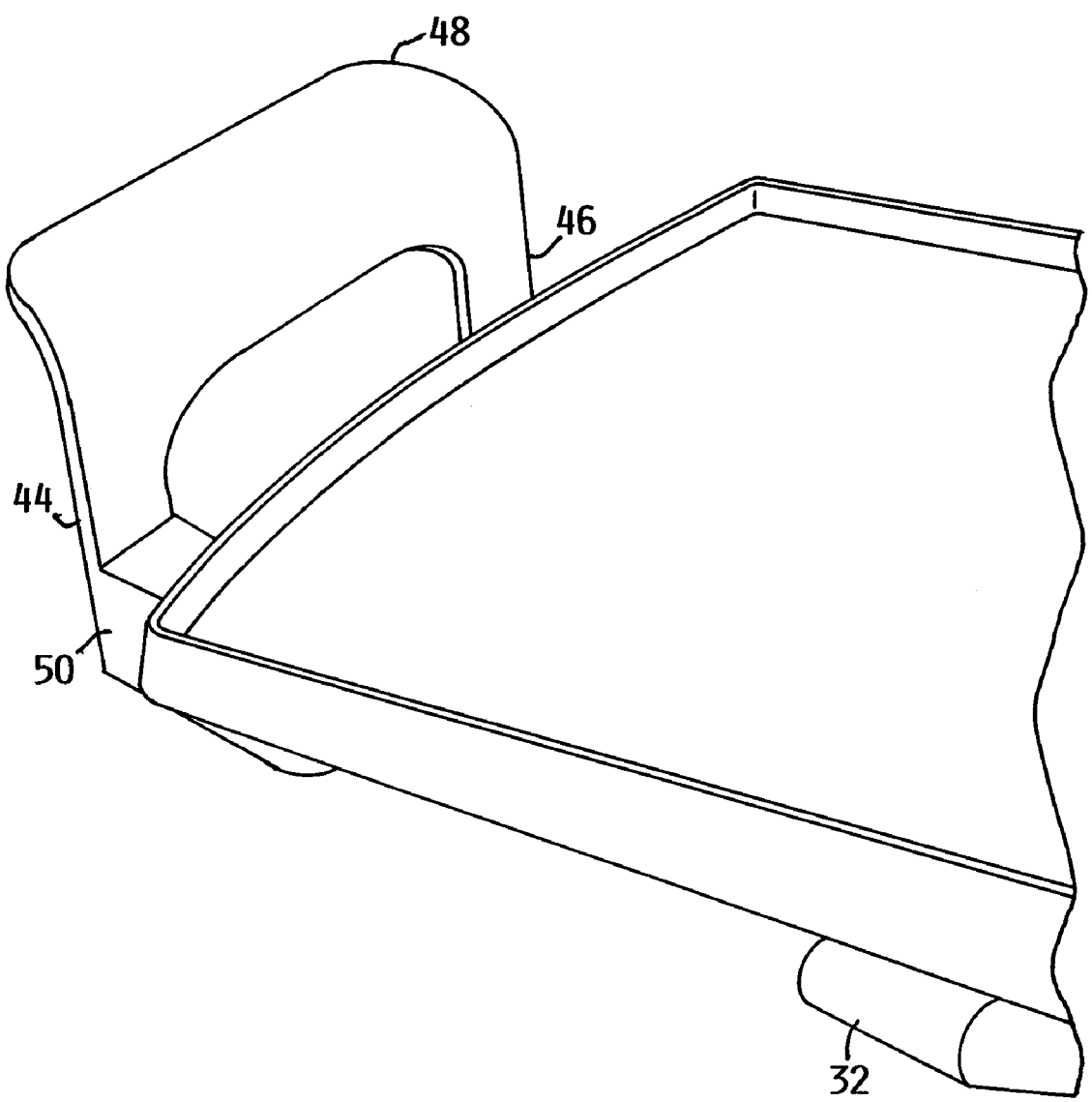
FIG. 9 is a partial perspective view of the cooking appliance in the draining cooking position.

As illustrated in FIGS. 1 and 2, each of the handles 16 includes first 44 and second 46 spaced legs. The legs 44, 46 are coupled together by a handle portion 48 extending between and integral to each of spaced legs 44, 46. As illustrated in FIG. 7, handle portion 48 may be generally arcuate for easier grasping by a hand of a user.

As illustrated in FIGS. 1 and 2, each of spaced legs 44, 46 may be generally arcuate along a longitudinal axis for positioning handle portion 48 a lateral distance away from heating plate 12. The arcuately configured spaced legs 44, 46 create a handle 16 that is cooler to the touch. Each of the handles 16 is preferably manufactured from a heat resistant plastic capable of withstanding heat emitted from heating plate 12, however, other materials may also be utilized.

Each of the spaced legs 44, 46 preferably includes a laterally extending foot portion 50 for supporting heating plate 12 in the cooking and draining positions. Each of the foot portions 50 is configured to mate with spaced bosses 52 extending perpendicularly away from lower surface 42 of heating plate 12. Each of foot portions 50 may be oriented generally parallel to lower surface 42 of heating plate 12.

Figure 4:
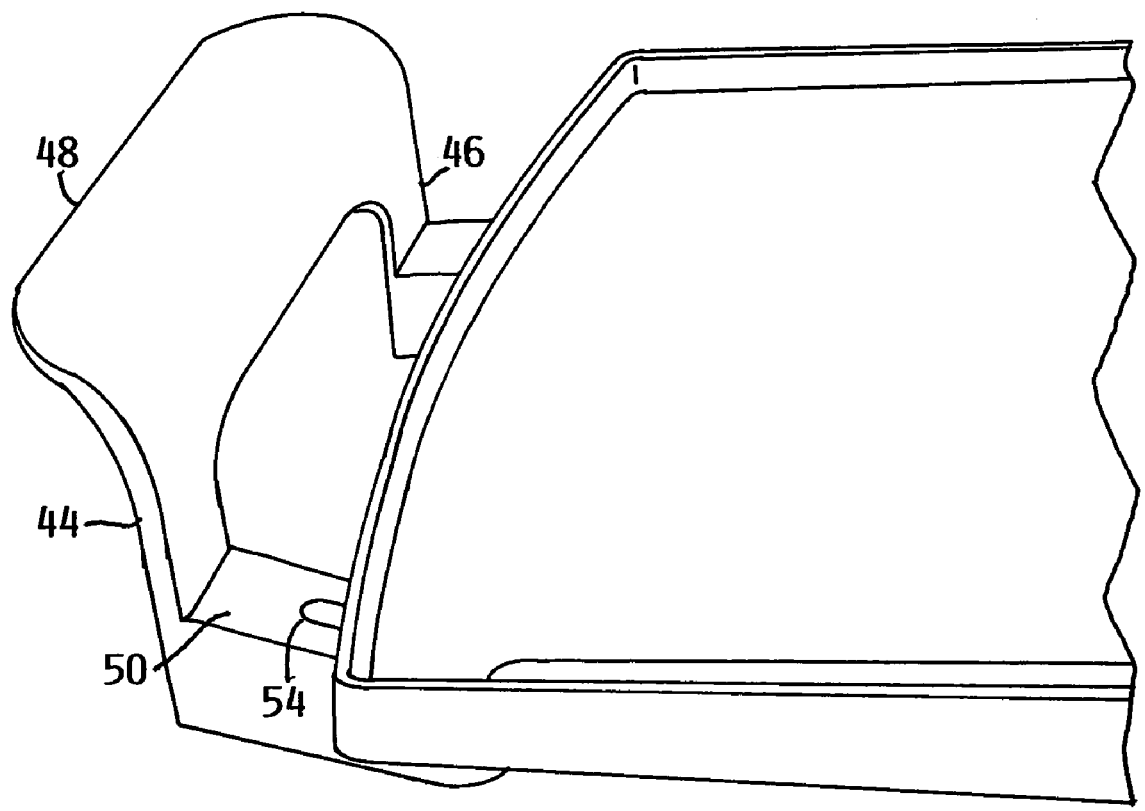
FIG. 4 is a partial perspective view of the cooking appliance in the draining cooking position.
Figure 5:
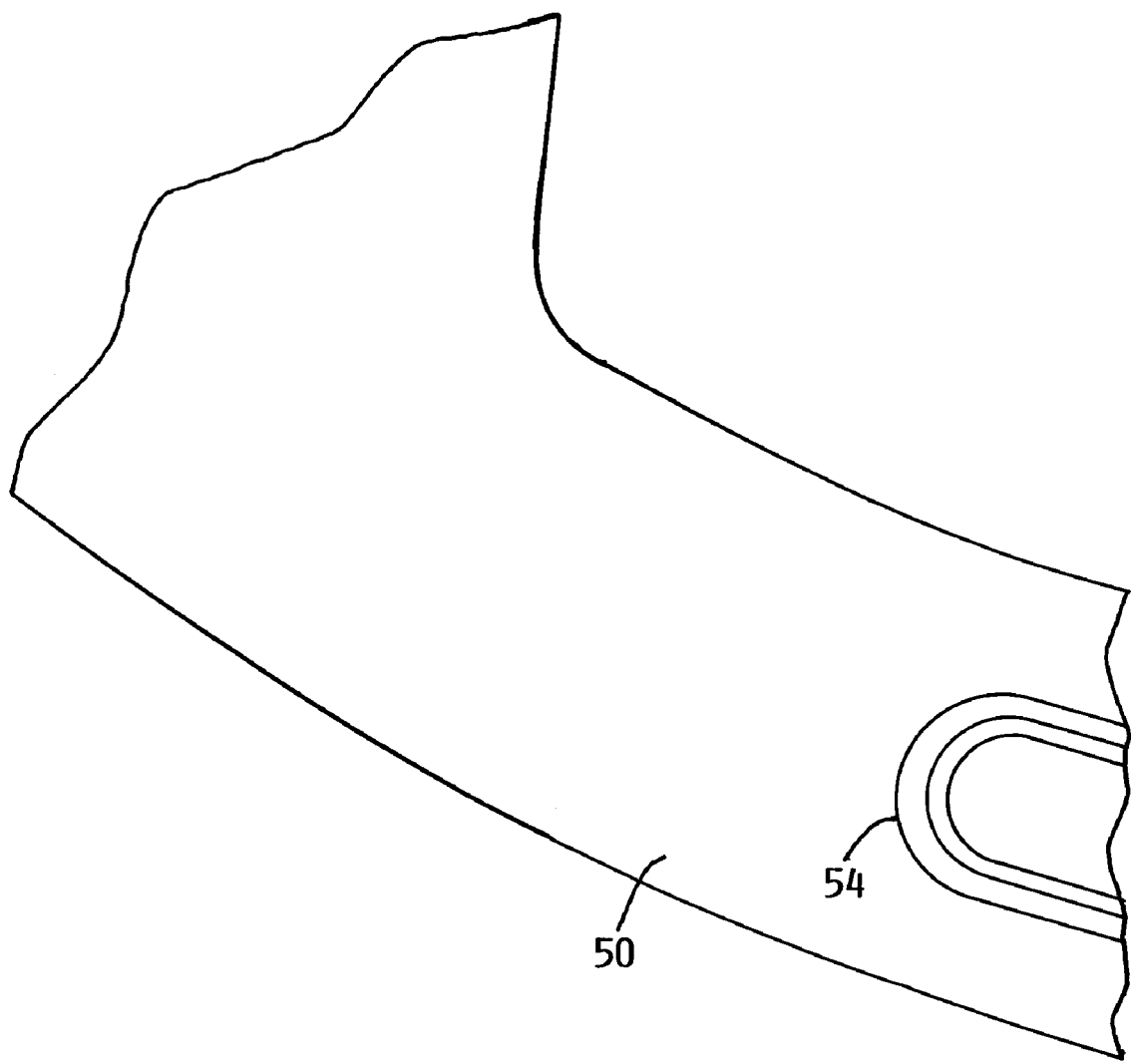
FIG. 5 is an enlarged partial view of a handle illustrating a slot that facilitates tilting of the heating plate.
Figure 6:
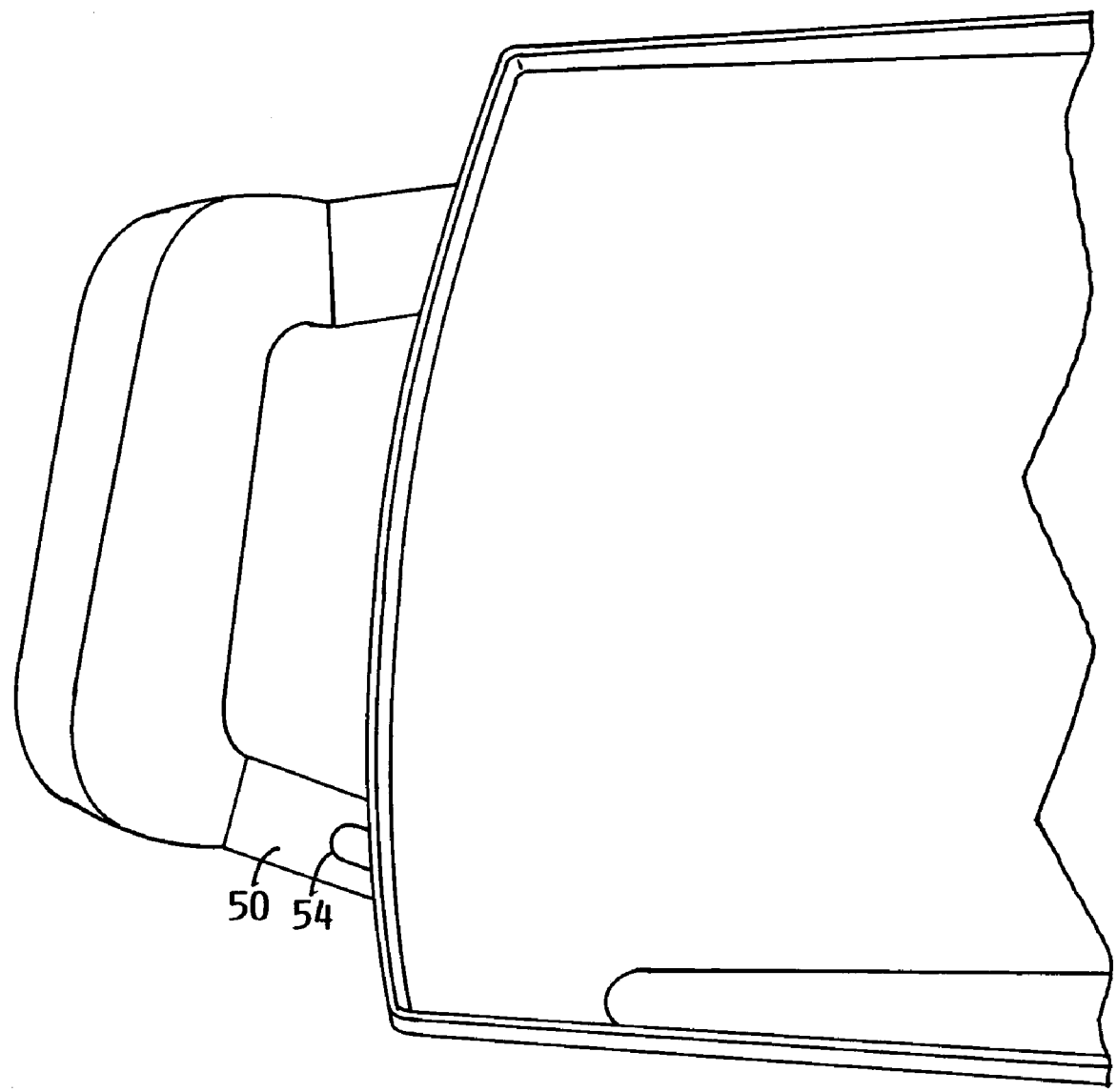
FIG. 6 is a partial top plan view of the cooking appliance in the draining cooking position.

As illustrated in FIGS. 4-6, foot portion 50 of first spaced leg 44 has an elongate slot 54 configured for permitting handle 16 to slidably mate with one of the spaced bosses 52 positioned relatively nearer front edge 13 of heating plate 12. In this embodiment, elongate slot 54 extends along a longitudinal axis of foot portion 50 to permit foot portion 50 of first spaced leg 44 to slide laterally away from heating plate 12. In one embodiment of the present invention, elongate slot 54 generally has an arcuate cross section taken generally parallel to the longitudinal axis of foot portion 50.

In one embodiment of the present invention, as particularly illustrated in FIG. 4, foot portion 50 of first spaced leg 44 has a height that varies along a length of foot portion 50 for facilitating tilting of heating plate 12 between the cooking and draining positions. The height of foot portion 50 of first spaced leg 44 may generally taper from handle portion 48 toward an end of foot portion 50 such that heating plate 12 moves from the cooking position toward the draining position as foot portion 50 of first spaced leg 44 is moved laterally away from heating plate 12 (see direction arrow A in FIG. 2).

The foot portion 50 of second spaced leg 46 may include a hole 58 configured for rotatably mating with one of the spaced bosses 52 positioned relatively nearer rear edge 14 of heating plate 12. The rotatable mating of foot portion 50 of second spaced leg 46 creates a pivot point by which foot portion 50 of first spaced leg 44 may rotate about when moving laterally inward or outward from heating plate 12. In one embodiment of the present invention, hole 58 is preferably positioned generally adjacent to an end of foot portion 50 of second spaced leg 46, so as not to inhibit the tilting of heating plate 12.

In operation, heating plate 12 may be kept in either a horizontal or a draining cooking position, as illustrated in FIGS. 1 and 2, respectively. Heating plate 12 may be moved between the horizontal and draining cooking positions before, during or after cooking.

As each of the handles 16 is rotated outwardly, front edge 13 of heating plate 12 travels down foot portion 50 of first spaced legs 44. As heating plate 12 tilts toward the draining position the fats and oils begin to flow toward channel 30 and drain aperture 28. The fats and oils are then captured in collector pan 32, which may be slid out a later time for disposal of the fats and oil. Moving handles 16 in the opposite direction of arrow A lifts front edge 13 of heating plate 12 and places appliance back to cooking position.

The above invention is applicable to cooking appliances such as griddles, fry pans, and table top grilling appliances such as hamburger grills and the like.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A cooking apparatus supportable on a generally horizontal support surface, comprising:

a cooking plate baying a cooking surface and an opposed lower surface;

a handle assembly operably coupled to said cooking plate and shiftable between a first handle position and a second handle position relative to said cooking plate, said handle assembly including a downwardly extending leg element adapted for orienting said cooking surface in spaced apart relationship with said generally horizontal support surface, and interface structure oriented between said handle assembly and said cooking plate lower surface, said interface structure including a first portion having a first depth and a second portion having a second depth, said interface structure first portion operably engaging said cooking plate lower surface when said handle assembly is in said first position and said interface second portion operably engaging said cooking plate lower surface when said handle assembly is in said second position, such that said cooking plate is shiftable between a first position generally parallel to said support surface when said handle assembly is in said first position, and a second position generally transverse to said support surface when said handle assembly is in said second position.

2. The cooking apparatus of claim 1, wherein the first depth is different thin the second depth.

3. The cooking apparatus of claim 1, wherein at least a portion of the handle assembly is integral with the interface structure.

4. The cooking apparatus of claim 1, further comprising a drain aperture disposed in the cooking plate.

5. The cooking apparatus of claim 4, wherein the cooking surface defenes a channel configured to direct fluid to the drain aperture.

6. The cooking apparatus of claim 5, further comprising a collection pan configured to capture fluid exiting the drain aperture.

7. The cooking apparatus of claim 6, further comprising a plurality of rails attached to the lower surface, wherein the plurality of rails are configured to support the collection pan.

8. The cooking apparatus of claim 1, wherein the interface structure is fabricated of heat resistant plastic able to withstand temperatures in excess of 450° F. (232° C.

9. The cooking apparatus of claim 1, wherein the handle assembly is rotatably coupled to the cooking plate.

10. The cooking apparatus of claim 1, wherein the second position of the cooking plate is located at an angle of at least 1 degree from the first position of the cooking plate.

11. The cooking apparatus of claim 1, wherein the cooking plate further comprises a peripheral wall extending from the cooking surface.

12. The cooking apparatus of claim 1, further comprising a heating element.

13. A cooking apparatus comprising:

a cooking plate having a cooking surface and an opposed lower surface;

a handle assembly operably coupled to said cooking plate and shiftable between a first handle position and a second handle position relative to said cooking plate, said handle assembly including an interface structure having a first depth and a second depth, wherein the first depth engages the lower surface when the handle assembly is in the first handle position and the second depth engages the lower surface when the handle assembly is in the second handle position.

14. The cooking apparatus of claim 13, wherein the cooking surface is in first position generally parallel to the horizontal plane when the handle assembly is in the first handle position.

15. The cooking apparatus of claim 14, wherein the cooking surface is in a second position generally transverse to the horizontal plane when the handle assembly is in the second position.

16. The cooking apparatus of claim 15, wherein the second position of the cooking surface is located at least 1 degree apart from the first position of the cooking surface.

17. The cooking apparatus of claim 13, wherein the first depth is distinct from the second depth.

18. The cooking apparatus of claim 13, wherein the handle assembly further comprises a leg element adapted for orienting the cooking surface away from a support surface.

19. The cooking apparatus of claim 18, wherein the first depth is located between the leg element and the second depth.

20. A cooking apparatus supportable on a generally horizontal support surface, comprising:

a cooking plate having a cooking surface and an opposed lower surface;

a plurality of handles rotatably coupled to said cooking plate and shiftable between a first handle position and a second handle position relative to the cooking plate, the plurality of handles including a leg element adapted to orient the cooking plate in spaced apart relationship with said generally horizontal support surface, and;

interface structure integral with the plurality of handles and operably engaging the lower surface of the cooking plate, said interface structure including a first portion having a first depth and a second portion having a second depth distinct from the first depth, such that the cooking plate is shiftable between a first position generally parallel to the support surface when the handle assembly is in the first position, and a second position generally transverse to the support surface when the handle assembly is in the second position.

21. The cooking apparatus of claim 1, wherein a nonstick coating is disposed on the cooking surface.

* * * * *

UNITED STATES PATENT AND TRADEMARK OFFICE
CERTIFICATE OF CORRECTION

PATENT NO. : 7,523,697 B2  Page 1 of 1
APPLICATION NO. : 11/084059
DATED : April 28, 2009
INVENTOR(S) : Hedrington It is certified that error appears in the above-identified patent and that said Letters Patent is hereby corrected as shown below:

Column 6, Line 1 Claim 1:
Delete "baying" and insert --having--.

Column 6, Line 26 Claim 2:
Delete "thin" and insert --than--.

Column 6, Line 44 Claim 8:
Delete "(232°C." and insert --(232°C).--.

Column 6, Line 49 Claim 10:
Delete "1" and insert --1--.

Column 7, Line 2 Claim 14:
After "is in" insert --a--.

Signed and Sealed this

Third Day of August, 2010

David J. Kappos
*Director of the United States Patent and Trademark Office*